(12) United States Patent
Lee et al.

(10) Patent No.: US 11,733,685 B2
(45) Date of Patent: Aug. 22, 2023

(54) SURFACE INSPECTION METHOD USING MOLD SURFACE INSPECTION DEVICE

(71) Applicant: GIST(Gwangju Institute of Science and Technology), Gwangju (KR)

(72) Inventors: Sun Kyu Lee, Gwangju (KR); Dae Gweon Koh, Gwangju (KR); Han Ul Kim, Gwangju (KR); Jin Hyuk Hong, Gwangju (KR); Dinuka Ravimal Ranawaka Arachchige, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 301 days.

(21) Appl. No.: 17/038,386

(22) Filed: Sep. 30, 2020

(65) Prior Publication Data

US 2021/0247749 A1   Aug. 12, 2021

(30) Foreign Application Priority Data

Feb. 7, 2020  (KR) .................... 10-2020-0015066

(51) Int. Cl.
*G05B 19/418* (2006.01)
*G01N 21/88* (2006.01)
*G06T 7/00* (2017.01)

(52) U.S. Cl.
CPC ... *G05B 19/41875* (2013.01); *G01N 21/8806* (2013.01); *G06T 7/0008* (2013.01); *G06T 2207/10052* (2013.01)

(58) Field of Classification Search
CPC ........... G01N 21/8806; G01N 21/8851; G01N 2021/8887; G01N 2021/8893;

(Continued)

(56) References Cited

U.S. PATENT DOCUMENTS

| 6,498,867 B1 * | 12/2002 | Potucek | H04N 1/02815 |
| | | | 382/274 |
| 8,848,201 B1 * | 9/2014 | Bruce | G01B 21/047 |
| | | | 356/601 |
| 2019/0320094 A1* | 10/2019 | Jackson | G01N 21/251 |

FOREIGN PATENT DOCUMENTS

| JP | 2005-265543 A | 9/2005 |
| JP | 2007-333457 A | 12/2007 |

(Continued)

OTHER PUBLICATIONS

An Office Action mailed by the Korean Patent Office dated Jun. 24, 2021, which corresponds to Korean Patent Application No. 10-2020-0015066 and is related to U.S. Appl. No. 17/038,386; with English language translation.

*Primary Examiner* — Tri T Ton
(74) *Attorney, Agent, or Firm* — Studebaker & Brackett PC (57) ABSTRACT

The present disclosure relates to a surface inspection method using a mold surface inspection device, and more specifically, to a surface inspection method using a mold surface inspection device including a setting part in which an inspection object is set, a light source part configured to irradiate the inspection object with irradiated light so that a reflective highlight is generated on a surface of the inspection object, an imaging part configured to image the surface of the inspection object so that a highlight region where a reflective highlight is generated is included, and an image processing part configured to process an image imaged in the imaging part to provide the image to a worker so that the worker determines whether defects are generated on the surface of the inspection object on the basis of the image.

13 Claims, 6 Drawing Sheets

(58) Field of Classification Search
CPC .......... G01N 21/9515; G05B 19/41875; G05B 2219/32177; G05B 2219/32217; G05B 2219/37208; G06T 2207/10052; G06T 7/0008; G06T 7/0004; G01B 11/24; Y02P 90/02
USPC ...................... 356/237.1–237.6, 239.1–239.8
See application file for complete search history.

(56) References Cited

FOREIGN PATENT DOCUMENTS

| | | |
|---|---|---|
| JP | 2019-032268 A | 2/2019 |
| KR | 10-2017-0137222 A | 12/2017 |

\* cited by examiner

SURFACE INSPECTION METHOD USING MOLD SURFACE INSPECTION DEVICE

CROSS-REFERENCE TO RELATED APPLICATION

This application claims priority to and the benefit of Korean Patent Application No. 10-2020-0015066, filed on Feb. 7, 2020, the disclosure of which is incorporated herein by reference in its entirety.

BACKGROUND

1. Field of the Invention

The present disclosure relates to a surface inspection method using a mold surface inspection device, and more specifically, to a surface inspection method using a mold surface inspection device which processes an image included in a highlight region where a reflective highlight is generated to determine the occurrence of defects on the surface of an inspection object and then provides the image to a worker.

2. Discussion of Related Art

Generally, a process of manufacturing a frame or panel generally processes a metal through a mold machine, and after a process of grinding a surface of the processed metal, the metal is assembled or completed. Thereafter, the frame or panel is finally completed through a press process.

However, in the process of grinding a surface, traces of machining tools, scratch surface contamination, and the like occur. Accordingly, in order to discover the above, skilled workers directly investigate surface defects by hand and eye. However, this not only takes a long time, but also generates inefficient manpower consumption.

Accordingly, since a process for surface defect inspection needs to be automated, surface defect inspection technology is required, and as prior art developed for the above-described problems, techniques such as a contact type surface shape measuring device (stylus) which inspects surface defects by measuring surface roughness and waviness of the metal and confocal microscopy have been developed and used. However, the prior art has a problem in that measurement is limited according to the size and shape of metal or a limitation occurs in an inspection time or an inspection range.

As another example of prior art, a machine vision system which inspects a surface by digitizing an image or a surface inspection method using a charge-coupled device (CCD) camera which receives diffused light on the surface has been developed and used, but in the prior art, due to the filtering work of light-receiving data of a reflective highlight for inspection purposes and the like, there are disadvantages of difficulty in inspecting small size scratches or processing marks and difficulty in being applied to glossy surfaces.

(Patent Document 1) Korean Application Patent Publication No. 10-2017-0137222: Surface defect inspection device of steel sheet and surface defect inspection method

SUMMARY OF THE INVENTION

The present disclosure is directed to providing a surface inspection method using a mold surface inspection device which processes an image included in a highlight region where a reflective highlight is generated to determine the occurrence of defects on the surface of an inspection object and then provides the image to a worker.

According to an aspect of the present disclosure, there is provided a mold surface inspection device including a setting part in which an inspection object is set, a light source part configured to irradiate the inspection object with irradiated light so that a reflective highlight is generated on a surface of the inspection object, an imaging part configured to image the surface of the inspection object so that a highlight region where the reflective highlight is generated is included, and an image processing part configured to process an image imaged by the imaging part to provide the image to a worker so that the worker determines whether defects are generated on the surface of the inspection object on the basis of the image.

The image processing part may include an image conversion module configured to convert the image provided from the imaging part to grayscale to generate an analysis image, and a display part configured to display the analysis image to the worker.

The image processing part may further include a scale value calculation part configured to calculate a grayscale value for a predetermined unit region selected from the analysis image by the worker.

The scale value calculation part may include an input module in which the worker sets the unit region in the analysis image, and a calculation part configured to calculate the unit region of the analysis image selected from the input module in a grayscale value, and the calculation part may display the unit region and the calculated grayscale value through the display part.

The setting part may rotatably support the inspection object with respect to a virtual center line which extends in a vertical direction so that the highlight region for the inspection object may be changed.

The setting part may include a frame, a turntable rotatably installed on the frame with respect to the center line, and on which the inspection object is set, a driving part configured to drive the turntable, and a controller configured to control the driving part so that the turntable is rotated by a predetermined angle.

The light source part may be installed so that an optical axis of the irradiated light may have a predetermined incident angle to the surface of the inspection object to generate the reflective highlight on the surface of the inspection object using the irradiated light.

The light source part may have an incident angle of 45°.

The light source part may be a light emitting diode (LED) configured to generate white light.

The imaging part may be installed to be spaced apart from the inspection object by a predetermined distance, and may be installed to face the surface of the inspection object on which the irradiated light is incident.

According to another aspect of the present disclosure, there is provided a surface inspection method using a mold surface inspection device provided with a setting part in which an inspection object is set, a light source part configured irradiate a surface of an inspection object with irradiated light, and an imaging part configured to image the surface of the inspection object, the surface inspection method including an irradiating operation of irradiating the inspection object with irradiated light using the light source part so that a reflective highlight is generated on the inspection object set in the setting part, an imaging operation of imaging a surface of the inspection object through the imaging part so that a highlight region where the reflective highlight is generated is included, and an image processing operation of processing an image imaged in the imaging operation so that a worker determines whether defects are generated on the surface of the inspection object on the basis of the image.

The setting part may rotatably support the inspection object with respect to a virtual center line in a vertical direction, and may rotate the inspection object by a predetermined angle so that the highlight region for the inspection object may be changed in the irradiating operation.

In the irradiating operation, the light source part may be set so that an angle between the surface of the inspection object and an optical axis of the irradiated light may have a predetermined incident angle to generate the reflective highlight on the surface of the inspection object using the irradiated light.

The incident angle may be 45°.

The light source part may be an LED configured to generate white light.

The imaging part may be installed to be spaced apart from the inspection object by a predetermined distance, and may be installed to face the surface of the inspection object on which the irradiated light is incident, to image the surface of the inspection object.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a surface inspection method using a mold surface inspection device according to an embodiment of the present disclosure will be described in detail with reference to the accompanying drawings. Since the present disclosure may be variously changed and have various embodiments, particular embodiments are exemplified in the drawings and related detailed descriptions are disclosed. However, the present disclosure is not limited to the particular embodiments and includes all changes, equivalents, and substitutes within the spirit and the scope of the present disclosure. In the description of the drawings, similar reference numerals are used for similar elements. In the accompanying drawings, sizes of structure are shown to be enlarged from actual sizes for clarity of the present disclosure.

Further, although the terms "first," "second," and the like may be used herein to describe various elements, the elements should not be limited by the terms. The terms may be used only to distinguish one element from another. For example, 'a first element' could be referred to as 'a second element', and similarly, 'a second element' could be referred to as 'a first element' without departing from the scope of the present disclosure.

Terms used in the present disclosure are used solely to describe the particular embodiments and not to limit the present disclosure. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present disclosure have meanings the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIGS. 1 to 4, a mold surface inspection device 10 according to one embodiment of the present disclosure includes a setting part 100, a light source part 200, an imaging part 300, and an image processing part 400.

The setting part 100 has an inspection object 105 which is set therein, and includes a frame 110, a turntable 120, a driving part 130, and a controller 140. The inspection object 105 refers to a metal or the like for manufacturing an automobile frame 110 or a panel.

Figure 1:
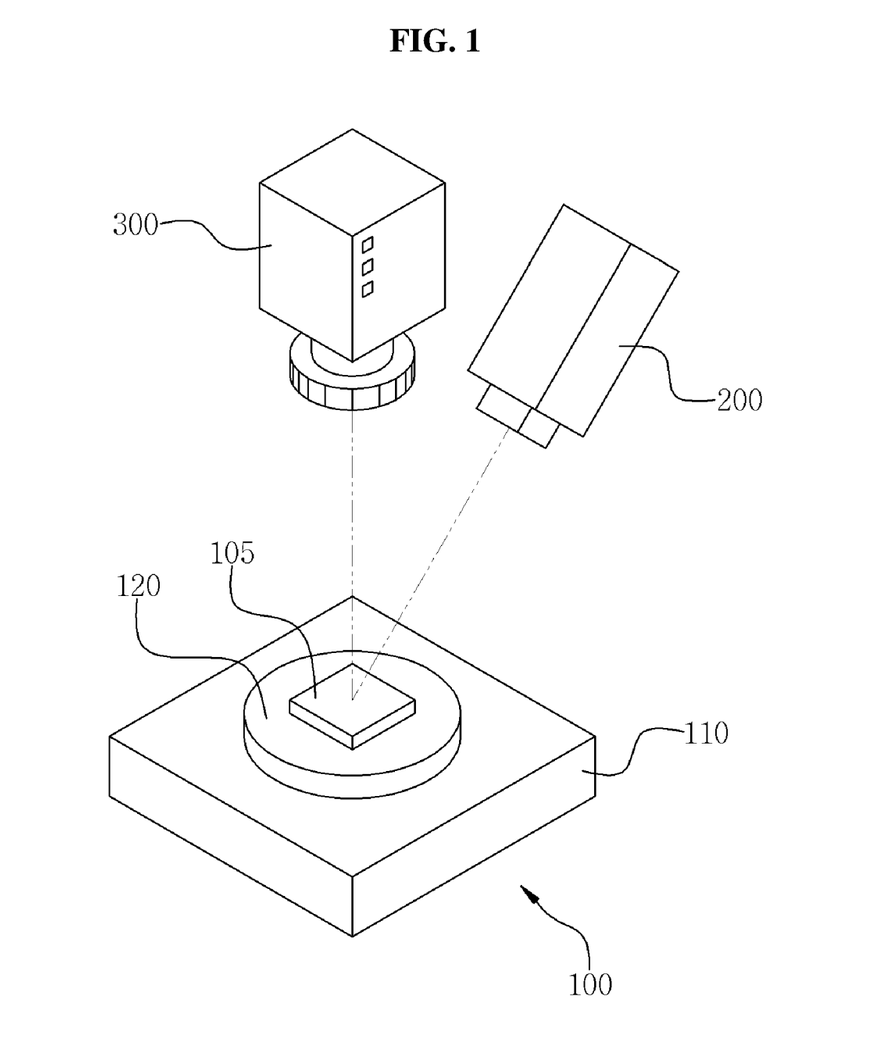
FIG. 1 is a perspective view illustrating a mold surface inspection device according to one exemplary embodiment of the present disclosure.
Figure 2:
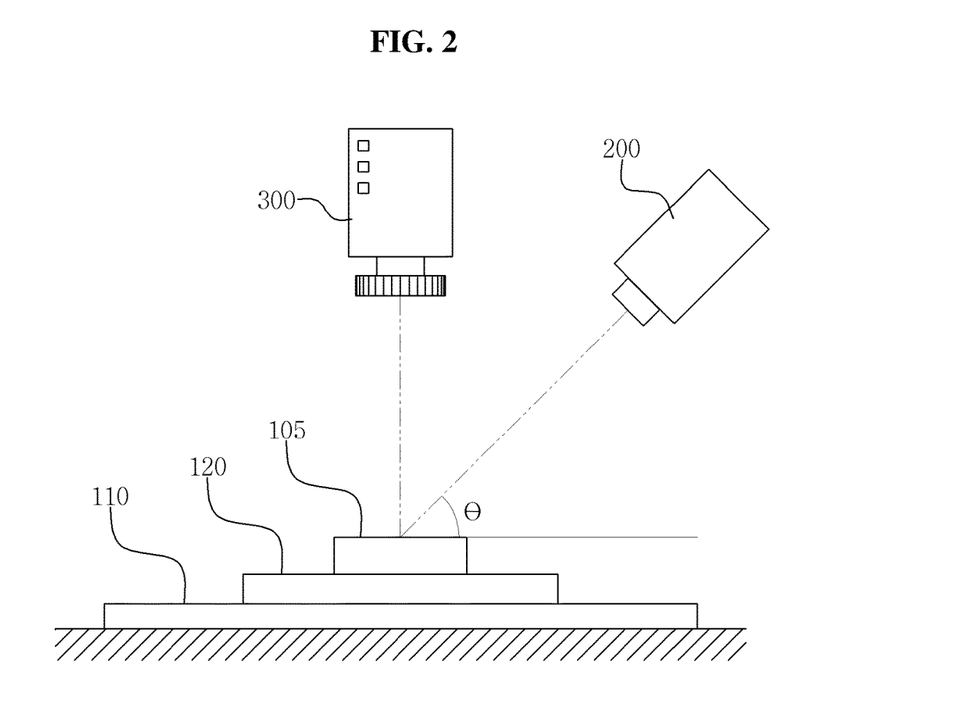
FIG. 2 is a front view illustrating the mold surface inspection device according to one exemplary embodiment of the present disclosure.
Figure 4:
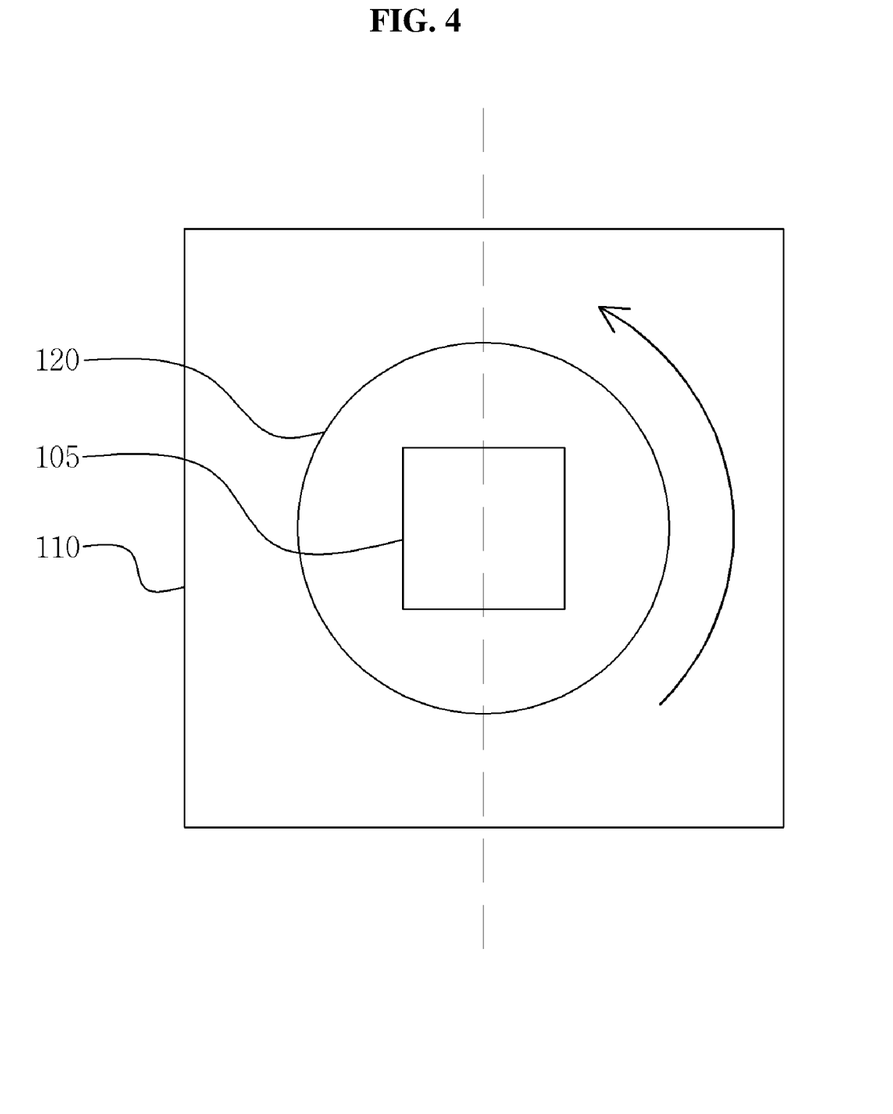
FIG. 4 is a plan view illustrating a setting part of the mold surface inspection device according to one exemplary embodiment of the present disclosure.

The frame 110 may be formed of a synthetic resin material, such as plastic having predetermined strength and excellent moldability, in a polygonal shape. Further, the frame 110 may be preferably installed in a rigid structure which is not deformed even when an external force is applied.

The inspection object 105 is set on the turntable 120, and the turntable 120 is rotatably installed on the frame 110 with respect to the virtual center line. In this case, the turntable 120 is installed to be rotatable 0° to 180°.

Figure 3:
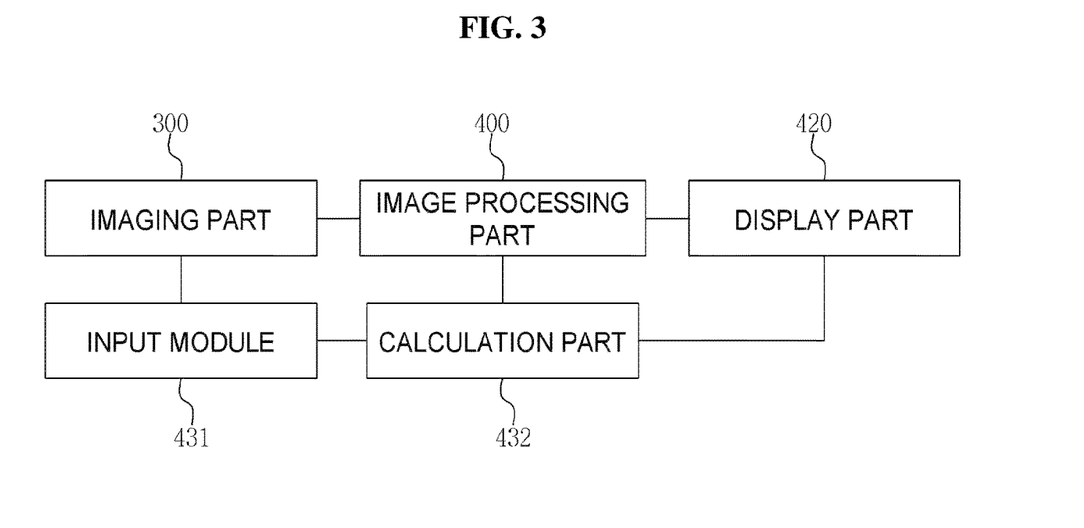
FIG. 3 is a block diagram illustrating the mold surface inspection device according to one exemplary embodiment of the present disclosure.

Although not shown in the drawings, the driving part 130 is provided to drive the turntable 120, and generally, refers to a motor installed in the turntable 120, and the motor is installed in the frame 110.

The controller 140 is provided to control the driving part 130 so that the turntable 120 rotates by a predetermined angle, and controls the driving part 130 to sequentially rotate the turntable 120 by a predetermined unit angle from the initial setting of the turntable 120. The predetermined unit angle of the turntable 120 refers to an interval of 10°.

The controller 140 may control the imaging part 300 so that the inspection object 105 is imaged by the imaging part 300 when rotation of the turntable 120 by the predetermined unit angle is completed. Accordingly, a plurality of images of the inspection object 105 including the initial setting state of the inspection object 105 are imaged by the imaging part 300.

The light source part 200 is installed adjacent to the frame 110 through a support unit (not shown). Further, the light source part 200 may be set by the support unit so that an axis of irradiated light forms an incident angle.

The inspection object 105 is irradiated with irradiated light so that a reflective highlight is generated on a surface of the inspection object 105. The reflective highlight (a specular highlight) refers to a bright portion that appears on the inspection object 105 when the light source part 200 emits the irradiated light.

The light source part 200 is installed so that an optical axis of the irradiated light has a predetermined incident angle to the surface of the inspection object 105. In this case, the incident angle is 45°.

The light source part 200 may be a light emitting diode (LED) which generates white light. The LED is used in one embodiment of the present disclosure, but the present disclosure is not limited thereto, and halogen, metal halide, and fluorescent lamps, and the like may be used.

The imaging part 300 is provided to image the surface of the inspection object 105 so that a highlight region where the reflective highlight is generated is included, is installed to be spaced apart from the inspection object 105 by a predetermined distance, and is installed to face the surface of the inspection object 105 on which the irradiated light is incident. Specifically, the imaging part 300 is installed to be spaced apart from the inspection object 105 by a predetermined distance in an upward direction.

Since the imaging part 300 is a generally used camera and is a conventional configuration, specific descriptions in detail will be omitted.

The image processing part 400 is provided to process an image imaged by the imaging part 300 to provide the image to a worker so that the worker may determine whether defects are generated on the surface of the inspection object 105 on the basis of the image, and includes an image conversion module 410, a display part 420, and a scale value calculation part 430.

The generated defects refer to remaining traces of processing tools, marks of milling tools generated during work, marks generated during grinding, cracks caused by material defects, chatter marks due to tool vibration, scratches due to treatment or handling, and the like.

The image conversion module 410 converts the image provided from the imaging part 300 to grayscale to generate an analysis image. The grayscale is generally used to evaluate a difference in brightness, and refers to a measure of the difference in brightness in graduated shades of gray from achromatic to black.

The display part 420 is provided to display the analysis image to the worker, and generally refers to a liquid crystal display (LCD). Further, the display part 420 may be provided with a communication module to transmit the analysis image to a terminal of a manager or a management server.

The scale value calculation part 430 is provided to calculate a grayscale value for a predetermined unit region selected from the analysis image by the worker, and includes an input module 431 and a calculation part 432.

In the input module 431, the worker sets the unit region in the analysis image. An input means such as a keyboard or a mouse may be provided so that the unit region may be set through the analysis image displayed on the display part 420.

The unit region refers to a portion where contrast in the remaining portion other than the reflective highlight is distinct at a boundary region between the reflective highlight and a peripheral portion, and refers to a region inferred by the worker as having a surface defect in the inspection object 105 or a specific region which is arbitrarily selected by the worker.

Points to be analyzed may be set as first points and second points in the unit region of the input module 431. The first points are a boundary adjacent to the reflective highlight shown in the analysis image, and are peak portions of the surface of the inspection object 105, the second points are adjacent to the first points, and valley portions of the surface of the inspection object 105 may be applied as the second points.

The calculation part 432 calculates the unit region of the analysis image selected from the input module 431 in a grayscale value, and the worker may determine whether the inspection object has surface defects through a difference between a grayscale value of the first point and a grayscale value of the second point in the unit region.

Further, the calculation part 432 displays the unit region and the calculated grayscale values through the display part 420. Accordingly, the worker may determine whether the surface of the inspection object 105 has the defects by confirming the grayscale values calculated through the display part 420.

Accordingly, in the mold surface inspection device of the present disclosure, the light source part 200 irradiates the inspection object 105 with the irradiated light so that the reflective highlight is generated on the surface of the inspection object 105 set in the setting part 100.

Subsequently, after imaging the surface of the inspection object 105 so that the highlight region where the reflective highlight is generated by the imaging part 300 is included, there is an advantage in that the image is processed and provided to the worker so that the worker may determine whether the surface of the inspection object 105 has the defects on the basis of the generated image.

A surface inspection method using the mold surface inspection device according to one embodiment of the present disclosure will be described.

Figure 5:
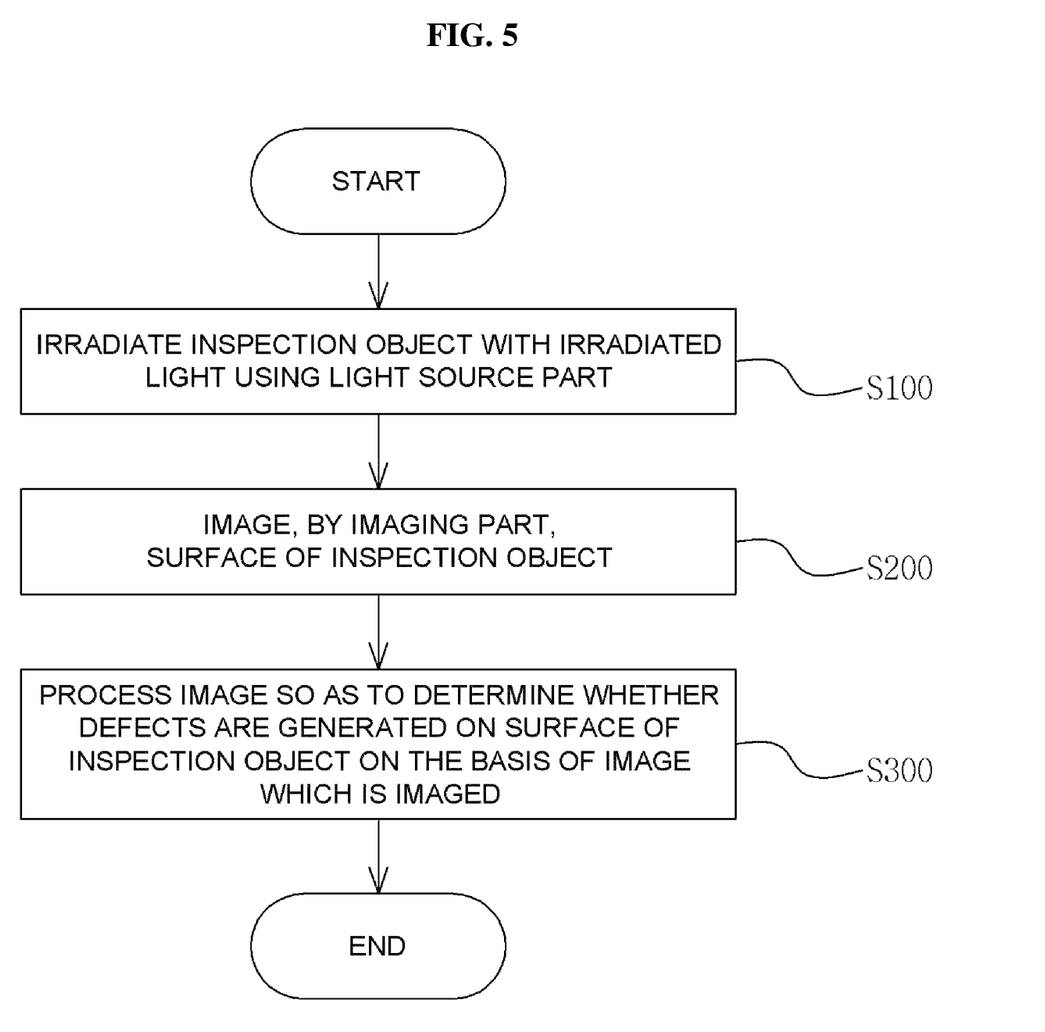
FIG. 5 is a flow chart illustrating a surface inspection method using the mold surface inspection device according to one exemplary embodiment of the present disclosure.

Referring to FIG. 5, the surface inspection method using the mold surface inspection device includes an irradiating operation S100, an imaging operation S200, and an image processing operation S300.

In the irradiating operation S100, the inspection object 105 is irradiated with the irradiated light using the light source part 200 so that the reflective highlight is generated on the inspection object 105 set in the setting part 100. In this case, the setting part 100 rotatably supports the inspection object 105 with respect to a virtual center line in a vertical direction, and rotates the inspection object 105 by a predetermined angle so that the highlight region for the inspection object 105 is changed.

In the irradiating operation S100, the light source part 200 is set so that an angle between the surface of the inspection object 105 and an optical axis of the irradiated light has a predetermined incident angle to generate the reflective highlight on the surface of the inspection object 105 using the irradiated light. In this case, the incident angle is 45°. Further, an LED which generates white light is used for the light source part 200.

In the imaging operation S200, the surface of the inspection object 105 is imaged through the imaging part 300 so that the highlight region where the reflective highlight is generated is included. In this case, the imaging part 300 is installed to be spaced apart from the inspection object 105 by a predetermined distance, and is installed to face the surface of the inspection object 105 on which the irradiated light is incident, to image the surface of the inspection object 105.

In the image processing operation S300, an image imaged in the imaging operation S200 is processed so that the worker may determine whether defects are generated on the surface of the inspection object 105 on the basis of the image.

Embodiment

In accordance with one embodiment of the present disclosure, the inspection object 105 is irradiated with the irradiated light using the light source part 200 so that the reflective highlight is generated on the inspection object 105 set in the setting part 100.

Subsequently, the surface of the inspection object 105 is imaged through the imaging part 300 so that the highlight region where the reflective highlight is generated is included, and the image which is imaged is converted to grayscale and processed and thus an analysis image is generated so that the worker may determine whether defects are generated on the surface of the inspection object 105 on the basis of the image.

The worker sets the unit region in the analysis image using the scale value calculation part 430 of the image processing part 400, and calculates the set unit region of the analysis image in a grayscale value. Whether defects are generated on the surface of the inspection object 105 is determined through grayscale values of the first point and the second point of the unit region which is set in the analysis image.

The first points are peaks of the surface of the inspection object 105, and the second points are valleys of the surface of the inspection object 105, and whether defects are generated on the surface of the inspection object 105 is determined through a difference between the grayscale values of the first point and the second point. A result thereof is shown in the following Table 1 and FIG. 6.

TABLE 1

| Point | 1 | 2 | 3 | 4 |
|---|---|---|---|---|
| peaks of surface (A, B, C, D) | 212 | 187 | 139 | 146 |
| valleys of surface (A'B'C'D') | 22 | 23 | 28 | 34 |
| difference | 190 | 164 | 11 | 112 |

Comparative Example

After the image is generated by imaging the surface of the inspection object 105 set in the setting part 100 through the imaging part 300, the image which is imaged is converted to grayscale and processed and thus the analysis image is generated so that the worker may determine whether defects are generated on the surface of the inspection object 105 on the basis of the image. The worker sets the unit region in the analysis image using the scale value calculation part 430, and calculates the set unit region of the analysis image in the grayscale value.

Whether defects are generated on the surface of the inspection object 105 is determined through the grayscale values of the first point and the second point of the unit region in the analysis image in the same manner as in the embodiment of the present disclosure.

The first points are peaks of the surface of the inspection object 105, and the second points are valleys of the surface of the inspection object 105, and whether defects are generated on the surface of the inspection object 105 is determined through a difference between the grayscale values of the first point and the second point. A result thereof is shown in the following Table 2 and FIG. 7.

Comparing Results Between Embodiment and Comparative Example

Figure 6:
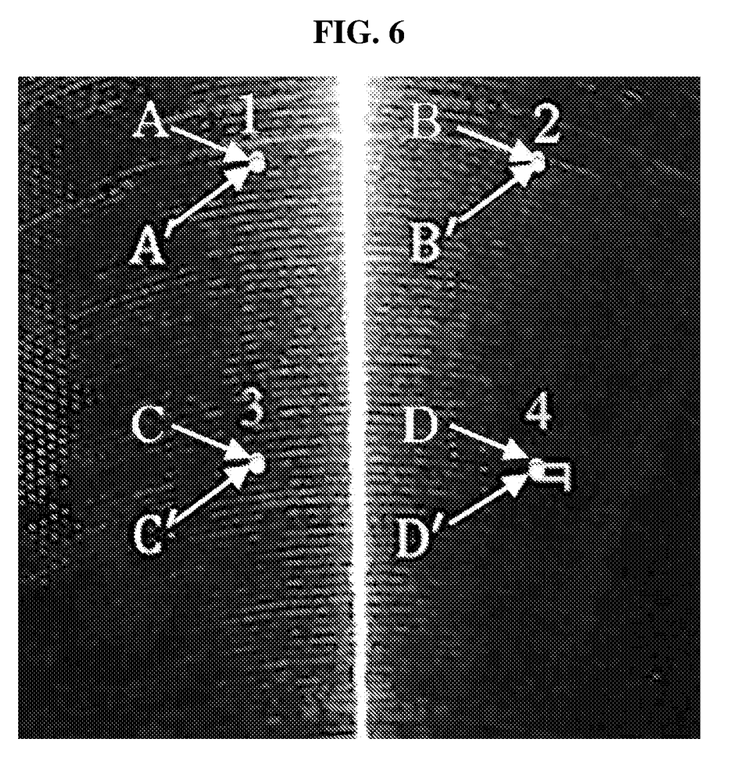
FIG. 6 is an analysis image according to one exemplary embodiment of the present disclosure.
Figure 7:
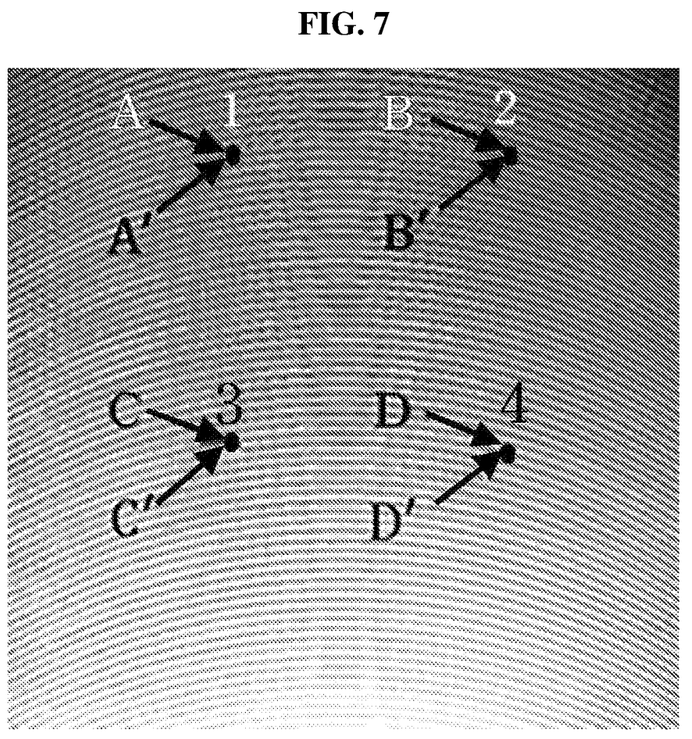
FIG. 7 is an analysis image according to Comparative example.

In one embodiment of the present disclosure, as shown in Table 1, the differences between the grayscale values of the peaks and the valleys of the surface are large. Further, as shown in FIG. 6, tool marks and scratches may be distinguished through the processed analysis image. However, in Comparative example, as shown in Table 2, there is a disadvantage in that the difference between the grayscale values of the peak and the valley of the surface is small, and tool marks and scratches may not be distinguished through the processed analysis image. Accordingly, when presence of the defects on the surface of the inspection object 105 is determined, one embodiment of the present disclosure is more advantageous than Comparative example.

TABLE 2

| Point | 1 | 2 | 3 | 4 |
|---|---|---|---|---|
| peaks of surface (A, B, C, D) | 209 | 222 | 247 | 243 |
| valleys of surface (A'B'C'D') | 164 | 157 | 189 | 187 |
| difference | 45 | 65 | 58 | 56 |

In a surface inspection method using a mold surface inspection device according to the present disclosure, since an image processing part which processes an image including a highlight region where a reflective highlight is generated to provide the image to a worker is provided, there is an effect in that the worker can determine whether defects are generated on a surface of an inspection object.

Descriptions of the presented embodiments are provided so that those skilled in the art may use or implement the present disclosure. Various modifications of the embodiments will be apparent to those skilled in the art, and general principles defined therein may be applied to other embodiments without departing from the scope of the present disclosure. Accordingly, the present disclosure is not limited to the embodiments presented herein, and should be understood in the broadest scope consistent with the presented principles and new features.

What is claimed is:

1. A mold surface inspection device comprising:
   a turntable in which an inspection object is set;
   a light emitting diode (LED) configured to irradiate the inspection object with irradiated light so that a reflective highlight is generated on a surface of the inspection object;
   a camera configured to image the surface of the inspection object so that a highlight region where the reflective highlight is generated is included;
   a liquid crystal display (LCD); and
   a processor configured to process an image imaged by the camera to provide the image to a worker so that the worker determines whether defects are generated on the surface of the inspection object on the basis of the image, wherein the processor is further configured to convert the image provided from the camera to grayscale to generate an analysis image, and the LCD is configured to display the analysis image to the worker, wherein the processor is further configured to calculate a grayscale value for a predetermined unit region selected from the analysis image by the worker, and wherein the processor is further configured to calculate the unit region of the analysis image selected based on a setting input received from the worker in the grayscale value, and the LED is configured to display the unit region and the calculated grayscale value.

2. The mold surface inspection device of claim 1, wherein the turntable rotatably supports the inspection object with respect to a virtual center line which extends in a vertical direction so that the highlight region for the inspection object is changed.

3. The mold surface inspection device of claim 2, wherein the turntable rotatably is configured to be installed on a frame with respect to the center line, and is configured to be driven by a motor installed in the turntable, so that the turntable is rotated by a predetermined angle.

4. The mold surface inspection device of claim 1, wherein the LED is installed so that an optical axis of the irradiated light has a predetermined incident angle to the surface of the inspection object to generate the reflective highlight on the surface of the inspection object using the irradiated light.

5. The mold surface inspection device of claim 4, wherein the LED has an incident angle of 45°.

6. The mold surface inspection device of claim 1, wherein the LED is configured to generate white light.

7. The mold surface inspection device of claim 1, wherein the camera is installed to be spaced apart from the inspection object by a predetermined distance, and is installed to face the surface of the inspection object on which the irradiated light is incident.

8. A surface inspection method using a mold surface inspection device provided with a turntable in which an inspection object is set, a light emitting diode (LED) configured to irradiate a surface of an inspection object with irradiated light, and a camera configured to image the surface of the inspection object, the surface inspection method comprising:

an irradiating operation of irradiating the inspection object with irradiated light using the LED so that a reflective highlight is generated on the inspection object set in the turntable;

an imaging operation of imaging a surface of the inspection object through the camera so that a highlight region where the reflective highlight is generated is included; and an image processing operation of processing an image imaged in the imaging operation so that a worker determines whether defects are generated on the surface of the inspection object on the basis of the image, wherein the image processing operation further comprises converting the image provided from the camera to grayscale to generate an analysis image, and displaying the analysis image to the worker, wherein the image processing operation further comprises calculating a grayscale value for a predetermined unit region selected from the analysis image by the worker, and wherein the image processing operation further comprises setting the unit region in the analysis image, calculating the unit region of the analysis image in a grayscale value; and displaying the unit region and the calculated grayscale value.

9. The surface inspection method of claim 8, wherein the turntable rotatably supports the inspection object with respect to a virtual center line in a vertical direction, and rotates the inspection object by a predetermined angle so that the highlight region for the inspection object is changed in the irradiating operation.

10. The surface inspection method of claim 8, wherein, in the irradiating operation, the LED is set so that an angle between the surface of the inspection object and an optical axis of the irradiated light has a predetermined incident angle to generate the reflective highlight on the surface of the inspection object using the irradiated light.

11. The surface inspection method of claim 10, wherein the incident angle is 45°.

12. The surface inspection method of claim 8, wherein the LED is configured to generate white light.

13. The surface inspection method of claim 8, wherein the camera is installed to be spaced apart from the inspection object by a predetermined distance, and is installed to face the surface of the inspection object on which the irradiated light is incident, to image the surface of the inspection object.

* * * * *